(12) United States Patent
Dooley Maley et al.

(10) Patent No.: US 8,571,986 B2
(45) Date of Patent: Oct. 29, 2013

(54) DEPENDENT PAYMENT DEVICE

(75) Inventors: Kathleen Lisa Dooley Maley, Indian Trail, NC (US); Erik Stephen Ross, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 12/845,601

(22) Filed: Jul. 28, 2010

(65) Prior Publication Data
US 2012/0030109 A1  Feb. 2, 2012

(51) Int. Cl.
*G06Q 40/00* (2012.01)
*G07F 19/00* (2006.01)
*G06Q 20/10* (2012.01)
*G06Q 40/06* (2012.01)

(52) U.S. Cl.
CPC ............... *G06Q 40/00* (2013.01); *G07F 19/20* (2013.01); *G06Q 20/1085* (2013.01); *G07F 19/201* (2013.01); *G06Q 40/06* (2013.01)
USPC ................. 705/41; 705/39; 705/35; 235/379; 235/380; 235/382.5

(58) Field of Classification Search
CPC ..... G07F 19/20; G07F 19/201; G07F 7/1008; G06Q 20/1085; G06Q 20/341
USPC .............. 705/35, 39, 41; 235/379, 380, 382.5
See application file for complete search history.

(56) References Cited

U.S. PATENT DOCUMENTS

| | | | | |
|---|---|---|---|---|
| 5,953,710 | A * | 9/1999 | Fleming | 705/38 |
| 7,249,092 | B2 * | 7/2007 | Dunn et al. | 705/38 |
| 8,127,982 | B1 * | 3/2012 | Casey et al. | 235/379 |
| 2007/0226793 | A1 | 9/2007 | Tanabiki et al. | |
| 2008/0073430 | A1 * | 3/2008 | Sickenius | 235/383 |
| 2008/0133126 | A1 * | 6/2008 | Dupray | 701/204 |
| 2008/0281721 | A1 | 11/2008 | Simunovic | |
| 2009/0144193 | A1 | 6/2009 | Giordano et al. | |
| 2009/0254461 | A1 | 10/2009 | Walker et al. | |
| 2010/0082470 | A1 * | 4/2010 | Walach et al. | 705/35 |

OTHER PUBLICATIONS

Unknown, Cell phone software formats checks for online banking, Jan. 24, 2008, Information Week.*

* cited by examiner

*Primary Examiner* — Ella Colbert
*Assistant Examiner* — Scott S Trotter
(74) *Attorney, Agent, or Firm* — Michael A. Springs; Moore & Van Allen, PLLC; Jeffrey R. Gray

(57) ABSTRACT

The present invention provides embodiments of a dependent payment device, such as a credit card, for allowing a primary customer to control and monitor the transactions made by a dependent customer who is authorized to use the account of the primary customer. The primary customer can control the maximum limit that the dependent customer can spend on the dependent card up to the maximum amount that the financial institution has approved for the primary customer. The primary customer can also block/approve purchases that the dependent customer can make at store or on products by adding MCCs, store names, store types, UPCs, or other product or store identifiers to a list of blocked/approved transactions. The primary customer can set monetary and time limits on the amount and frequency of the transactions the dependent customer can make at stores or on products that have been blocked/approved.

57 Claims, 7 Drawing Sheets

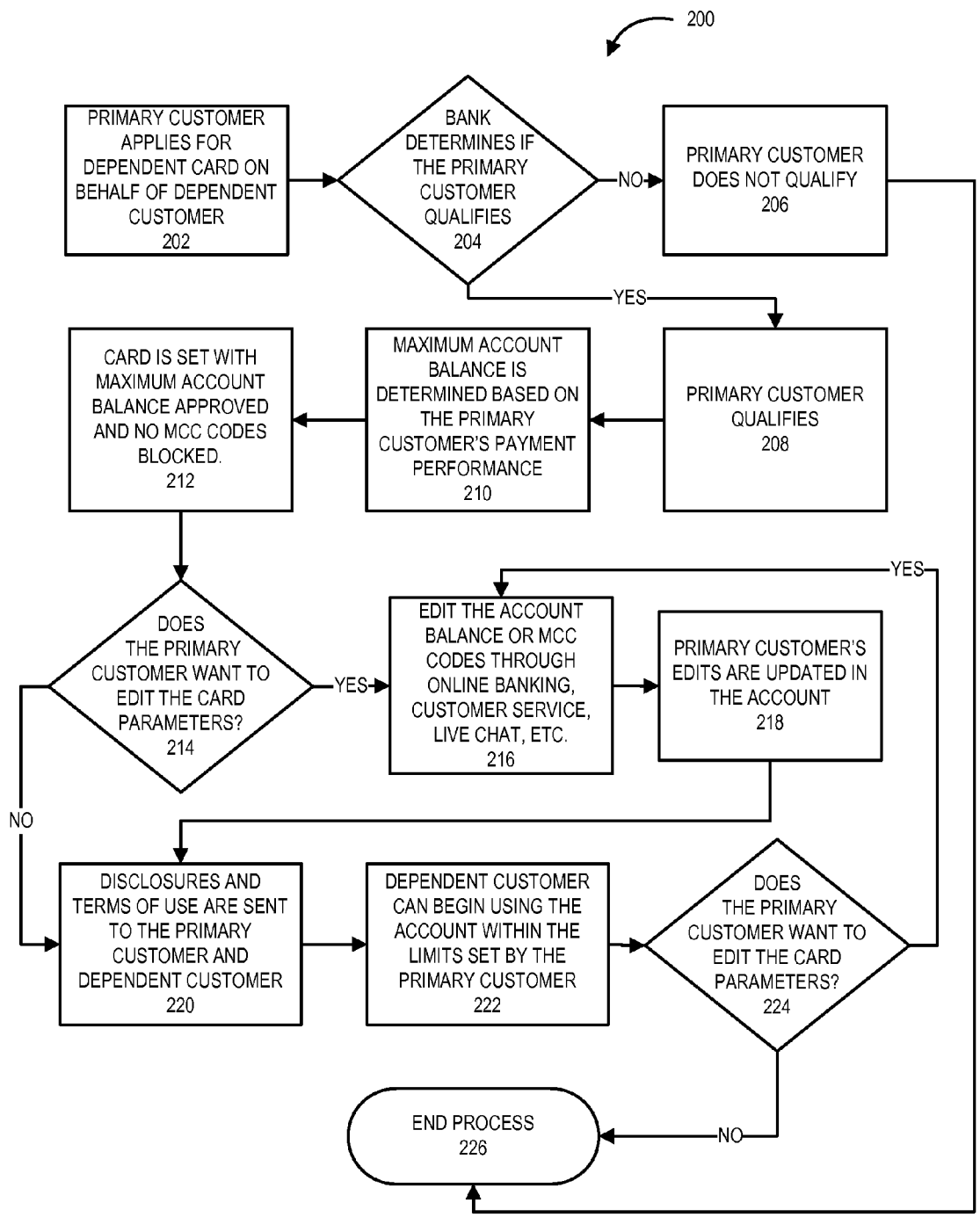

300

ONLINE BANKING  SIGN OFF
SEARCH • LOCATIONS • MAIL • HELP • EN ESPAÑOL

| ACCOUNTS | BILL PAY | TRANSFERS | INVESTMENTS | CUSTOMER SERVICE |

| ACCOUNTS OVERVIEW | ACCOUNT DETAILS | MY PORTFOLIO | ALERTS | OPEN AN ACCOUNT |

PERSONAL ACCOUNTS

USING ONLINE BANKING
- GET MORE FROM ONLINE BANKING
- INFO CENTER DEMOS, TUTORIALS, & ANSWERS

310

BANK ACCOUNTS

| ACCOUNT | BALANCE[a] | |
|---|---|---|
| REGULAR CHECKING | $45.00 | |
| REGULAR SAVINGS | $5.01 | |
| CORP | $0.00 | VIEW OPTIONS ▶ |
| CORPORATE CARD BUSINESS | $0.00 | VIEW OPTIONS ▶ |
| BUSINESS | $0.00 | VIEW OPTIONS ▶ |

MY PORTFOLIO >>
(NEW) SEE YOUR EXPENSES AUTOMATICALLY CATEGORIZED FOR YOU AND TRACK YOUR NET WORTH--INCLUDING YOUR 401(K), FREQUENT FLYER MILES AND MORE FROM OTHER INSTITUTIONS-- ALL IN ONE PLACE. AND ALL SERVICES ARE TOTALLY FREE WITH ONLINE BANKING.

DEPENDENT CREDIT CARD — 330

APPLY TO SET UP A DEPENDENT CREDIT CARD — 322
(NEW) NOW YOU CAN CONTROL THE SPENDING OF DEPENDENT USERS LISTED ON YOUR CREDIT CARD ACCOUNTS BY BLOCKING OR SETTING LIMITS ON THE PURCHASES THE DEPENDENT USERS CAN MAKE ON VARIOUS PRODUCTS AT VARIOUS STORES.

320

CUSTOMER SERVICE

| ACCOUNT SERVICES | MORE INFORMATION |
|---|---|
| VIEW/ PRINT STATEMENT | MOBILE BANKING |
| UPDATE YOUR E-MAIL ADDRESS | MANAGE ALERTS |
| UPDATE YOUR STREET ADDRESS AND/OR PHONE NUMBER | ONLINE BANKING USERS GUIDE |
| | ONLINE BANKING GUARANTEE |
| STOP CHECK PAYMENT | ONLINE BANKING SERVICE |
| REORDER CHECKS | AGREEMENT |
| ADD/EDIT ACCOUNT NICKNAME | BROWSER INFORMATION | a. THE BALANCE MAY REFLECT TRANSACTIONS THAT HAVE NOT YET POSTED TO YOUR ACCOUNT.

🔒 SECURE AREA.

|  |  |  |  |  |  |
|---|---|---|---|---|---|
|  |  | ONLINE BANKING  SIGN OFF |  |  |  |
|  |  | SEARCH • LOCATIONS • MAIL • HELP • EN ESPAÑOL |  |  |  |

ACCOUNTS | BILL PAY | TRANSFERS | INVESTMENTS | CUSTOMER SERVICE

CHECKING | SAVINGS | LOANS | CREDIT | DEPENDENT CREDIT

ACCOUNT | SET LIMITS | TRANSACTIONS

TRANSATION HISTORY

| DATE | DESCRIPTION | CUSTOMER | AMOUNT | TOTAL Bal. | LIMIT Bal. |
|---|---|---|---|---|---|
| 6/1/2010 | GROCERY STORE-5611 | DEPENDENT | ($100) | $100 | $400 |
| 6/3/2010 | CLOTHING STORE-5691 | DEPENDENT | ($150) | $250 | $50 |
| 6/7/2010 | RESTAURANT-5821 | DEPENDENT | ($30) | $280 | $270 |
| 6/8/2010 | GROCERY STORE-5411 | DEPENDENT | DENIED>$100 | --- | --- |
| 6/8/2010 | GROCERY STORE-5411 | DEPENDENT | ($100) | $380 | $300 |
| 6/10/2010 | CLOTHING STORE-5691 | DEPENDENT | ($50) | $430 | $0 |
| 6/10/2010 | CLOTHING STORE-5691 | PRIMARY | ($100) | $530 | --- |
| 6/14/2010 | RESTAURANT-5821 | DEPENDENT | ($70) | $600 | $200 |
| 6/14/2010 | PACKAGE STORE-5921 | DEPENDENT | DENIED | --- | --- |
| 6/15/2010 | PAYMENT | DEPENDENT | $400 | $200 | --- |
| 6/15/2010 | PAYMENT | PRIMARY | $200 | $0 | --- |

FIG. 6

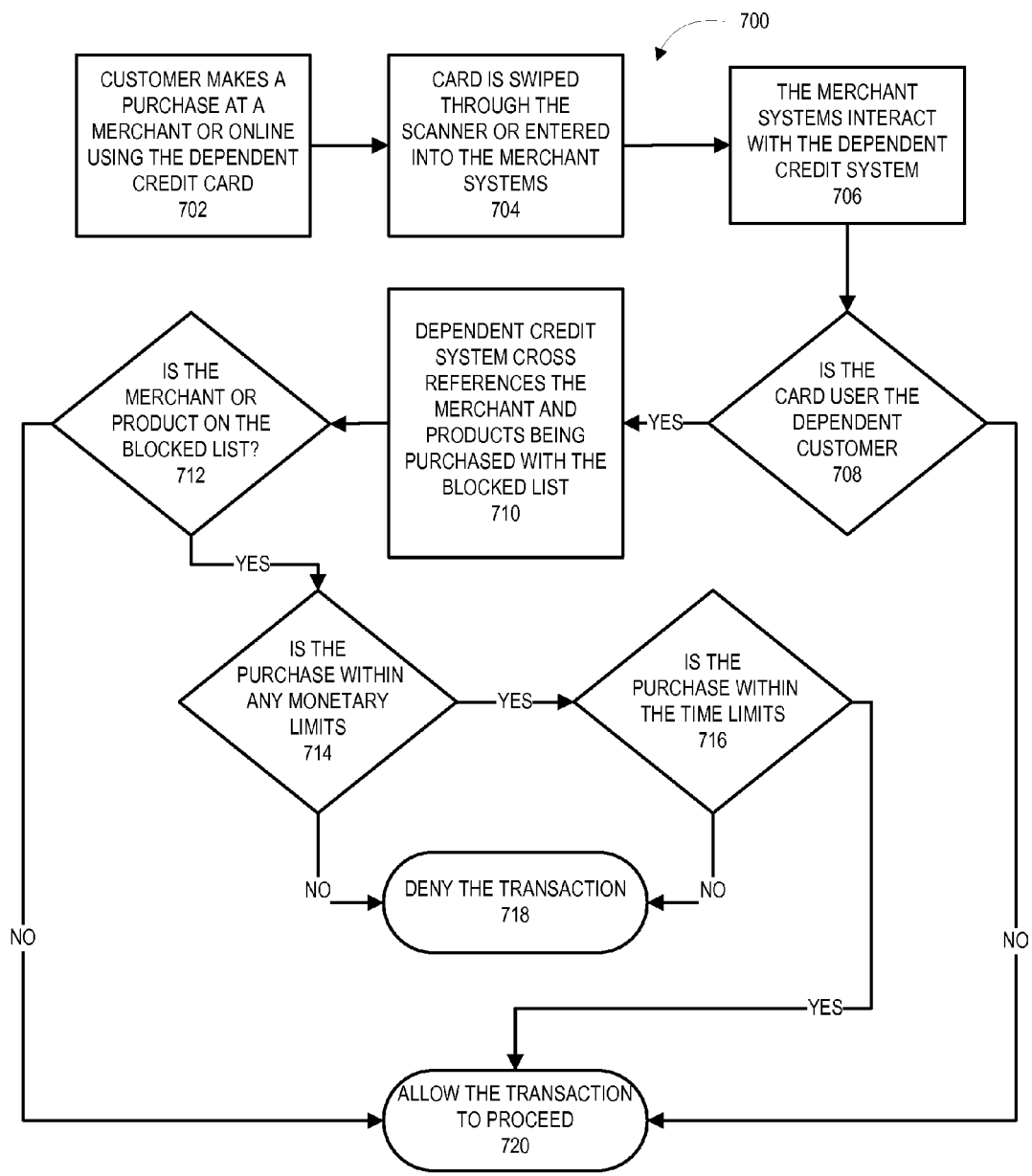

DEPENDENT PAYMENT DEVICE

FIELD

This invention relates generally to the field of payment devices, and more particularly embodiments of the invention relate to apparatuses and methods for a dependent payment device, such as a credit card, which provides credit privileges to dependent users and flexible control mechanisms over the use of the dependent payment device to the account holder.

BACKGROUND

The Credit Card Accountability Responsibility and Disclosure Act of 2009 (Credit Card Act of 2009) is a federal law passed by the United States Congress and signed by the President on May 22, 2009. Congress describes the Credit Card Act of 2009 as comprehensive credit card reform legislation for establishing fair and transparent practices relating to the extension of credit. The Credit Card Act of 2009, among many other various impacts, limits access to cards for people of certain ages, and allows cardholders to set limits on credit cards. The Credit Card Act of 2009 makes it more difficult for people with poor or no credit history to obtain a credit card. Notwithstanding the Credit Card Act of 2009, in times of economic recession or depression, it may also be increasingly difficult for people with poor or no credit history to be approved for a credit card because some financial institutions become more risk adverse during these times, and thus may limit the amount of credit that they extend to customers. Furthermore, credit card customers are typically averse to acting as co-signers for people with poor or no credit history because they do not want to be liable for any debt that other people on the card might accrue. Thus, there is a need to develop apparatuses and methods that help businesses provide credit options to consumers who are restricted by the Credit Card Act of 2009 and/or consumers with poor or no credit history, as well as helping customers limit the debt that any consumers authorized to use the credit card account of the customers can accrue.

BRIEF SUMMARY

Embodiments of the present invention address the above needs and/or achieve other advantages by providing apparatuses (e.g., a system, computer program product, and/or other device) and methods that help a dependent customer receive credit from a financial institution, and/or help a primary customer control the purchases made by the dependent customer.

Embodiments of the dependent credit system allow a primary customer to open a dependent credit account, such as, but not limited to a dependent credit card account, in order to control and monitor the transactions made by a dependent customer that is authorized to use the dependent credit account of the primary customer. In some embodiments other types of accounts can be used, such as debit accounts, in which case references to dependent credit accounts, systems, cards, etc. would be replaced by the other types of accounts, such as dependent debit accounts, systems, cards, etc. In some embodiments, the primary customer can set the maximum limit that the dependent customer can spend on the payment device up to the maximum amount that the financial institution has approved for the account. In some embodiments, the primary customer can also limit the transactions that the dependent customer can make at a store (i.e. a physical store location, over the Internet, over the telephone with a representative, etc.) or on goods or services (hereinafter "products"). In some embodiments the store includes specific stores, such as, but not limited to chain stores or individual stores, or in other embodiments store includes types of stores that are grouped together in various categories. A store can be grouped in more than one category, for example a one stop store that sells a range of products can be grouped as both a grocery store and an electronics store. In some embodiments the product includes specific products or lines of products, such as, but not limited to a product sold by a particular merchant, or in other embodiments product includes types of products that are grouped together in various categories. A product can be grouped into more than one category, for example, a specific beer can be grouped into a category with other beers and also be grouped into an alcoholic beverages category that includes beer, wine, and liquor.

The primary customer can limit the transactions that the dependent customer can make by, for example, adding Merchant Category Codes (MCCs), store names, store types, Universal Product Codes (UPCs), Stock Keeping Unit, product names, product types, and/or like identifiers to a blocked list or an approved list of stores or products. In some embodiments, the primary customer can set both monetary limits and time limits on the transactions the dependent customer can make at the blocked/approved types of stores or on the blocked/approved products that the primary customer added to the blocked/approved list. Furthermore, the primary customer can periodically edit the stores or the products on the blocked/approved list, as well as the monetary and time limits on the stores or products in order to control the transactions made by the dependent customer as the needs of the dependent customer change. In some embodiments, both the primary customer and dependent customer can view the transactions made through the account by logging into an online banking account. The dependent customer is prevented from having the ability to access the sections of the dependent credit account related to the limits set by the primary customer, which control the transactions the dependent customer is allowed to make.

In some embodiments, as explained herein the dependent payment device is a dependent credit card. However, it is to be understood that the dependent payment device can be another type of credit device, which can be scanned, transmit a wireless signal, entered manually into a system, etc. in order to make payments using the dependent payment device, as will be described in further detail later. For example, in some embodiments of the invention the dependent credit card may not be a card at all, it may be a mobile device or other electronic device that allows the user 9 to make a purchase at a store or over the internet by transmitting through a wire or wireless connection between the electronic device and the systems used to make the transaction.

One embodiment of the invention is a dependent financial transaction system, comprising a memory device, a communication device, and a processing device is operatively coupled to the memory device and the communication device. The processing device is configured to execute computer-readable program code to receive, through the communication device, a request from a primary customer to set one or more limits on a store or a product, in order to control transactions a dependent customer is permitted to make using a dependent payment device at the store or for the product. The processing device is further configured to save the one or more limits on the store or the product received from the primary customer in the memory device. The processing device is also configured to receive, through the communication device, a request from a merchant to allow the dependent customer to make a transaction using the dependent payment device. The processing device is further configured to compare the transaction against the one or more limits stored in the memory device. The processing device is also configured to approve or deny the transaction the dependent customer is trying to make based on the comparison of the transaction against the one or more limits stored in the memory device.

In further accord with an embodiment of the invention, the processing device is further configured to receive an application for the dependent payment device from the primary customer listing a person as the dependent customer.

In another embodiment of the invention, the one or more limits comprise a transaction prevention limit that controls the transactions made by the dependent customer by preventing the dependent customer from making transactions at the store or for the product.

In yet another embodiment of the invention, the one or more limits comprise a transaction allowance limit that controls the transactions made by the dependent customer by allowing the dependent customer to make transactions at the store or for the product.

In still another embodiment of the invention, the one or more limits comprise a monetary limit on an amount the dependent customer can spend at the store or for the product.

In further accord with another embodiment of the invention, the one or more limits comprise a time limit on the transaction the dependent customer can make at the store or for the product.

In another embodiment of the invention, the processing device is further configured to receive a request, through the communication device, from a merchant to allow the primary customer to make a second transaction using the dependent payment device and allow the primary customer to make the second transaction regardless if the second transaction meets or does not meet the one or more limits set on the store or the product.

In yet another embodiment of the invention, the processing device is further configured to receive a request, through the communication device, from the dependent customer to view transaction history and allow the dependent customer to view the transaction history in a transaction history interface.

In still another embodiment of the invention, the processing device is further configured to receive a request, through the communication device, from the dependent customer to view the one or more limits on the store or the product and allow the dependent customer to view the one or more limits on the store or the product in a limit interface.

In further accord with another embodiment of the invention, the processing device is further configured to receive a request, through the communication device, from the primary customer to view transaction history and allow the primary customer to view the transaction history in a transaction history interface.

In another embodiment of the invention, the processing device is further configured to receive a request, through the communication device, from the primary customer to view the one or more limits on the store or the product and allow the primary customer to view the one or more limits on the store or the product in a limit interface.

In yet another embodiment of the invention, the one or more limits comprise one or more limits on the store, and wherein the one or more limits on the store are assigned using a Merchant Category Code, a store type, or a store name. In still another embodiment of the invention, the one or more limits comprise one or more limits on the product, and wherein the one or more limits on the product are assigned using a Universal Product Code, Stock Keeping Unit, a product type, or a product name.

In still another embodiment of the invention, the dependent payment device comprises a credit card. In another embodiment of the invention, the dependent payment device comprises a debit card. In further accord with another embodiment of the invention, the dependent payment device is associated with a credit account for which the primary customer is at least partially responsible.

In another embodiment of the invention, the processing device configured to execute computer-readable program code to receive, through the communication device, a request from a primary customer to set one or more limits on a store or a product comprises receiving the request from a data capture device located in a mobile device.

In yet another embodiment of the invention, the processing device is further configure to receive information, from a data capture device from the dependent customer, regarding a store the dependent customer is located at or a product that the dependent customer is interested in. The processing device is further configured to determine whether the store the dependent customer is located at or the product that the dependent customer is interested in has an associated limit. The processing device is further configured to notify the dependent customer when the store the customer is located at or the product that the dependent customer is interested in has an associated limit.

In still another embodiment of the invention, the processing device is further configured to notify the dependent customer of the one or more limits when the primary customer sets or changes the one or more limits.

In further accord with an embodiment of the invention, the processing device is further configured to notify the primary customer when the transaction the dependent customer is trying to make is denied.

Another embodiment of the invention is a dependent financial transaction method. The method comprises receiving a request from a primary customer to set one or more limits on a store or a product, in order to control transactions a dependent customer is permitted to make using a dependent payment device at the store or for the product. The method further comprises saving the one or more limits on the store or the product received from the primary customer in a memory device. The method also comprises receiving a request from a merchant to allow the dependent customer to make a transaction using the dependent payment device. The method further comprises comparing, using a computer, the transaction against the one or more limits stored in the memory device. The method also comprises approving or denying the transaction the dependent customer is trying to make based on the comparison of the transaction against the one or more limits stored in the memory device.

In further accord with an embodiment of the invention, the method comprises receiving an application for the dependent payment device from the primary customer listing a person as the dependent customer.

In another embodiment of the invention, the one or more limits comprise a transaction prevention limit that controls the transactions made by the dependent customer by preventing the dependent customer from making transactions at the store or for the product.

In yet another embodiment of the invention, the one or more limits comprise a transaction allowance limit that controls the transactions made by the dependent customer by allowing the dependent customer to make transactions at the store or for the product.

In still another embodiment of the invention, the one or more limits comprise a monetary limit on an amount the dependent customer can spend at the store or for the product.

In further accord with an embodiment of the invention, the one or more limits comprise a time limit on the transaction the dependent customer can make at the store or for the product.

In another embodiment of the invention, the method comprises receiving a request from a merchant to allow the primary customer to make a second transaction using the dependent payment device and allowing the primary customer to make the second transaction regardless of whether the second transaction meets or does not meet the one or more limits set on the store or the product.

In yet another embodiment of the invention, the method comprises receiving a request from the dependent customer to view transaction history and allowing the dependent customer to view the transaction history in a transaction history interface.

In still another embodiment of the invention, the method comprises receiving a request from the dependent customer to view the one or more limits on the store or the product and allowing the dependent customer to view the one or more limits on the store or the product in a limit interface.

In further accord with an embodiment of the invention, the method comprises receiving a request from the primary customer to view transaction history and allowing the primary customer to view the transaction history in a transaction history interface.

In another embodiment of the invention, the method comprises receiving a request from the primary customer to view the one or more limits on the store or the product and allowing the primary customer to view the one or more limits on the store or the product in a limit interface.

In yet another embodiment of the invention, the one or more limits comprise one or more limits on the store, and wherein the one or more limits on the store are assigned using a Merchant Category Code, a store type, or a store name.

In still another embodiment of the invention, the one or more limits comprise one or more limits on the product, and wherein the one or more limits on the product are assigned using a Universal Product Code, Stock Keeping Unit, a product type, or a product name.

In further accord with an embodiment of the invention, the dependent payment device comprises a credit card. In still another embodiment of the invention, the dependent payment device comprises debit card. In another embodiment of the invention, the dependent payment device is associated with a credit account for which the primary customer is at least partially responsible.

In another embodiment of the invention, receiving a request from a primary customer to set one or more limits on a store or a product comprises receiving the request from a data capture device located in a mobile device.

In yet another embodiment of the invention, the dependent financial transition method further comprises receiving information, from a data capture device from the dependent customer, regarding a store the dependent customer is located at or a product that the dependent customer is interested in. The method also comprises determining whether the store the dependent customer is located at or the product that the dependent customer is interested in has an associated limit. The method further comprises notifying the dependent customer when the store the customer is located at or the product that the dependent customer is interested in has an associated limit.

In still another embodiment of the invention, the dependent financial transaction method, further comprises notifying the dependent customer of the one or more limits when the primary customer sets or changes the one or more limits, through the use of the processor.

In further accord with an embodiment of the invention, the dependent financial transaction method, further comprises notifying the primary customer when the transaction the dependent customer is trying to make is denied.

Another embodiment of the invention is a computer program product for a dependent financial transaction system. The computer program product comprises at least one non-transitory computer-readable medium having computer-readable program code portions embodied therein. The computer-readable program code portions comprise an executable portion configured for receiving a request from a primary customer to set one or more limits on a store or a product, in order to control transactions a dependent customer is permitted to make using a dependent payment device at the store or for the product. The computer-readable program code portions further comprise an executable portion configured for saving the one or more limits on the store or the product received from the primary customer in a memory device. The computer-readable program code portions also comprise an executable portion configured for receiving a request from a merchant to allow the dependent customer to make a transaction using the dependent payment device. The computer-readable program code portions further comprise an executable portion configured for comparing the transaction against the one or more limits stored in the memory device. The computer-readable program code portions also comprise an executable portion configured for approving or denying the transaction the dependent customer is trying to make based on the comparison of the transaction against the one or more limits stored in the memory device.

In further accord with an embodiment of the invention, the computer program product comprises an executable portion configured for receiving an application for the dependent payment device from the primary customer listing a person as the dependent customer.

In another embodiment of the invention, the one or more limits comprise a transaction prevention limit that controls the transactions made by the dependent customer by preventing the dependent customer from making transactions at the store or for the product.

In yet another embodiment of the invention, the one or more limits comprise a transaction allowance limit that controls the transactions made by the dependent customer by allowing the dependent customer to make transactions at the store or for the product.

In still another embodiment of the invention, the one or more limits comprise a monetary limit on an amount the dependent customer can spend at the store or for the product.

In further accord with an embodiment of the invention, the one or more limits comprise a time limit on the transaction the dependent customer can make at the store or for the product.

In another embodiment of the invention, the computer program product comprises an executable portion configured for receiving a request from a merchant to allow the primary customer to make a second transaction using the dependent payment device and an executable portion configured for allowing the primary customer to make the second transaction regardless if the second transaction meets or does not meet the one or more limits set on the store or the product.

In yet another embodiment of the invention, the computer program product comprises an executable portion configured for receiving a request from the dependent customer to view transaction history and an executable portion configured for allowing the dependent customer to view the transaction history in a transaction history interface.

In still another embodiment of the invention, the computer program product comprises an executable portion configured for receiving a request from the dependent customer to view the one or more limits on the store or the product and an executable portion configured for allowing the dependent customer to view the one or more limits on the store or the product in a limit interface.

In further accord with an embodiment of the invention, the computer program product comprises an executable portion configured for receiving a request from the primary customer to view transaction history and an executable portion configured for allowing the primary customer to view the transaction history in a transaction history interface.

In another embodiment of the invention, the computer program product comprises an executable portion configured for receiving a request from the primary customer to view the one or more limits on the store or the product and an executable portion configured for allowing the primary customer to view the one or more limits on the store or the product in a limit interface.

In yet another an embodiment of the invention, the one or more limits comprise one or more limits on the store, and wherein the one or more limits on the store are assigned using a Merchant Category Code, a store type, or a store name.

In still another embodiment of the invention, the one or more limits comprise one or more limits on the product, and wherein the one or more limits on the product are assigned using a Universal Product Code, Stock Keeping Unit, a product type, or a product name.

In further accord with an embodiment of the invention, the dependent payment device comprises a credit card. In still another embodiment of the invention, the dependent payment device comprise a debit card. In another embodiment of the invention the dependent payment device is associated with a credit account for which the primary customer is at least partially responsible.

In another embodiment of the invention, the executable portion configured for receiving a request from a primary customer to set one or more limits on a store or a product comprises receiving the request from a data capture device located in a mobile device.

In yet another embodiment if the invention, the computer program product further comprises an executable portion configured for receiving information, from a data capture device from the dependent customer, regarding a store the dependent customer is located at or a product that the dependent customer is interested in. The computer program product further comprises an executable portion configured for determining whether the store the dependent customer is located at or the product that the dependent customer is interested in has an associated limit. The computer program product further comprises an executable portion configured for notifying the dependent customer when the store the customer is located at or the product that the dependent customer is interested in has an associated limit.

In still another embodiment of the invention, the computer program product further comprises an executable portion configured for notifying the dependent customer of the one or more limits when the primary customer sets or changes the one or more limits, through the use of the processor.

In further accord with an embodiment of the invention, the computer program product, further comprises an executable portion configured for notifying the primary customer when the transaction the dependent customer is trying to make is denied.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
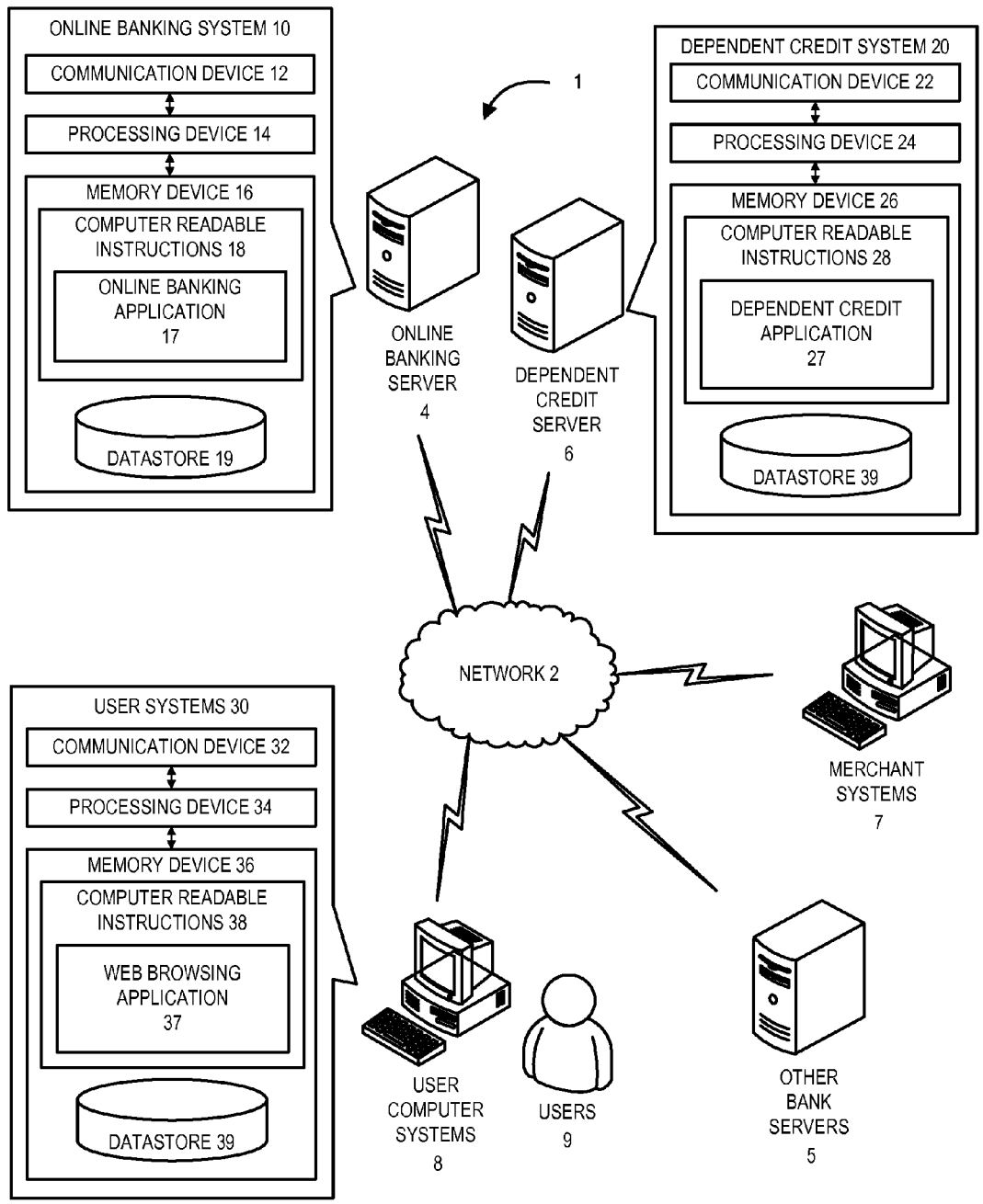
Figure 5:
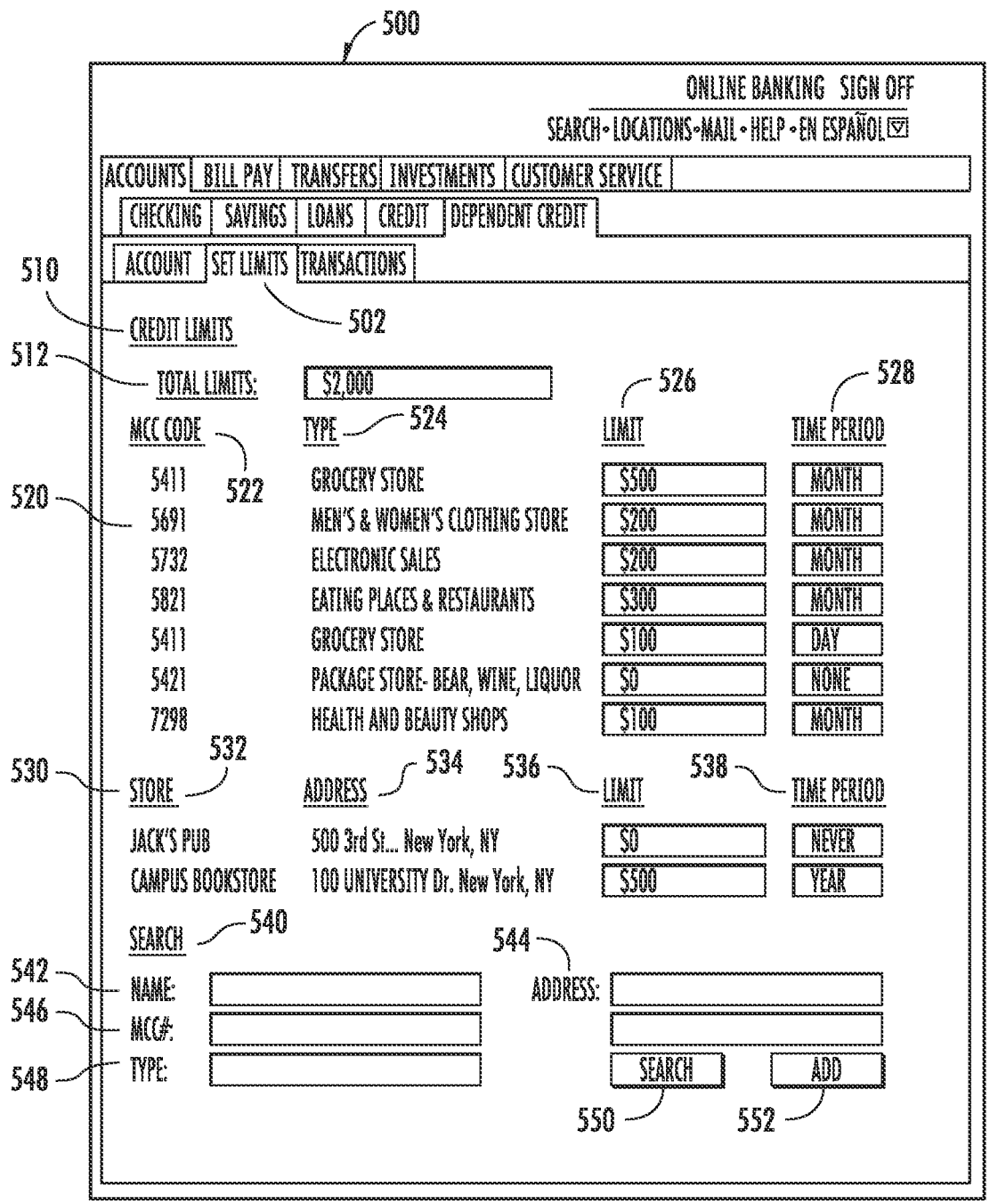

Having thus described embodiments of the invention in general terms, reference will now be made to the accompanying drawings, wherein:

FIG. 1 provides a block diagram illustrating a dependent financial transaction environment and system, in accordance with one embodiment of the present invention;

FIG. 2 provides a process map illustrating a dependent payment device account set up process, in accordance with one embodiment of the present invention;

FIG. 3 provides an online banking interface for setting up a dependent credit card program, in accordance with one embodiment of the present invention;

Figure 4:
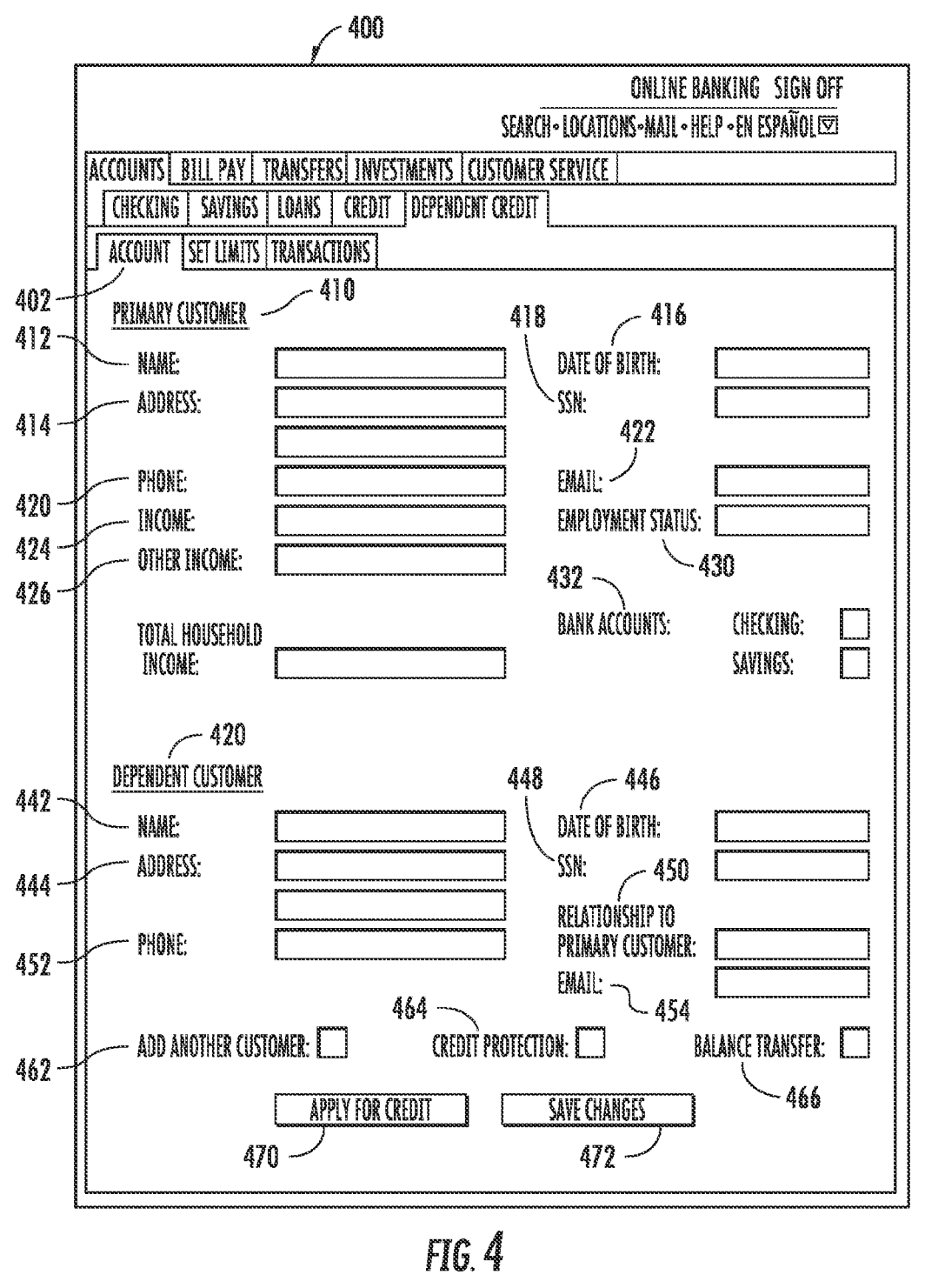

FIG. 4 provides an online banking dependent credit card account interface, in accordance with one embodiment of the present invention;

FIG. 5 provides an online banking dependent credit card limit interface, in accordance with one embodiment of the present invention;

FIG. 6 provides an online banking transaction history interface, in accordance with one embodiment of the present invention; and FIG. 7 provides a process map illustrating a dependent payment device transaction process, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "bank," one of ordinary skill in the art will appreciate that other embodiments of the invention may involve other businesses or financial institutions that take the place of or work in conjunction with the bank to perform one or more of the processes or steps described herein as being performed by a bank. Still in other embodiments of the invention the bank or financial institution described herein may be replaced with other types of businesses that offer payment devices to customers.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

FIG. 1 illustrates a dependent credit environment 1 and dependent credit system 20, in accordance with an embodiment of the present invention. As illustrated in FIG. 1, the online banking server 4 is operatively coupled, via a network 2 to the dependent credit server 6, other bank servers 5, merchant systems 7, and user computer systems 8. In this way, the online banking system 10 can receive and send information from and to the dependent credit system 20, user system 30, merchant systems 7, and systems located on other bank servers 5 so users 9 can view, sign up for, or manage their dependent credit account through online banking accounts. FIG. 1 illustrates only one example of embodiments of a dependent credit environment 1 and dependent credit system 20, and it will be appreciated that in other embodiments one or more of the servers or systems may be combined into a single server or system or be made up of multiple servers or systems.

In some embodiments of the invention, the users 9 can be either primary customers or dependent customers. The primary customers are generally users 9 that apply for the dependent credit card, set the limits on the dependent credit card, and are ultimately responsible for the debt accrued through the use of the dependent credit card. The primary customers, in some cases, are the only users 9 that can set-up and change the credit limits, the MCCs, and other inputs used for controlling the purchases of the dependent customers, as explained in further detail later. In contrast, the dependent customers are generally users 9 that often are not allowed to receive credit under the current laws governing credit cards or cannot by themselves receive approval from a financial institution for credit. The dependent customers, in most cases, are allowed to access an online banking account for viewing the account transactions and limits related to the dependent credit account, but do not have the ability to set or change the credit limit or the MCC transaction restrictions set by the primary customer. As such, the primary and dependent customers usually have different online banking accounts with different login identifiers. In some embodiments, "dependents" are legal dependents of the primary customers, while in other embodiments they are any person agreeing to provide the primary customers with control over use of the dependent's credit card or other financial account. Furthermore, although a credit card is often used to describe examples herein, other embodiments may include payment devices other than cards and/or financial accounts other than credit accounts.

In some embodiments the primary customer is a parent and the dependent customer is the child of the parent. The child may not be able to receive credit because the child is too young under the Credit Card Act of 2009 or other law, or the child has poor or no credit history and thus a financial institution may not approve the child for a credit card on the child's own. In some cases the child may be a student or may be living away from the parent, and may have a need to make purchases that he may not have the funds to make. Often a parent would want the child to have a credit card to make the necessary purchases the child needs or for emergency situations, school supplies, food, etc. Notwithstanding the child's need for credit or other sources of money, the parent would want to prevent the child from being able to abuse the credit card by preventing the child from being able to make purchases that the parent deemed unnecessary. The dependent credit card also allows the dependent customer to build up some credit history allowing the child to have a better chance to receive credit on his own when he reaches the proper age or has acquired the necessary credit worthiness. In some embodiments, the primary customer does not have to be a parent of the dependent customer. The primary customer can be a person that qualifies for credit from a financial institution, and the dependent customer can be a person that cannot qualify for credit on his own accord. For example, a child may need to control the spending of an elderly parent, a guardian may need to control the spending of a dependent, a person may need to control the spending of a friend or relative that cannot receive credit, an employer may need to control the spending of an employee, etc. In other embodiments of the invention, the primary customer and/or the dependent need not be actual people. In some embodiments of the invention, the primary customer can be a business or other entity, such as but not limited to a charitable organization, small business, fraternity, sorority, or other organization and the dependent customer is another entity or person who can act as a officer, agent, member, partner, employee, contractor, etc. of the primary customer. In some embodiments the primary customer is additionally liable for the credit used by the dependent customer, while in other embodiments the primary customer merely controls the dependent customer's access to the credit without being additionally liable for the credit used.

The network 2 may be a global area network (GAN), such as the Internet, a wide area network (WAN), a local area network (LAN), or any other type of network or combination of networks. The network 2 may provide for wireline, wireless, or a combination of wireline and wireless communication between devices on the network.

As illustrated in FIG. 1, the online banking system 10 is located on the online banking server 4, and generally comprises a communication device 12, a processing device 14, and a memory device 16. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 14 is operatively coupled to the communication device 12 and the memory device 16. The processing device 14 uses the communication device 12 to communicate with the network 2 and other devices on the network 2, such as, but not limited to, the dependent credit server 6, other bank servers 5, merchant systems 7, and user computer systems 8. As such, the communication device 12 generally comprises a modem, server, or other device for communicating with other devices on the network 2.

As further illustrated in FIG. 1, the online banking system 10 comprises computer-readable instructions 18 stored in the memory device 16, which in one embodiment includes the computer-readable instructions 18 of an online banking application 17. In some embodiments, the memory device 16 includes a datastore 19 for storing data related to the online banking system 10, including but not limited to data created and/or used by the online banking application 17.

In the embodiment illustrated in FIG. 1 and described throughout much of this specification, the online banking application 17 allows a user 9, either the primary customer or the dependent customer, to access and review the dependent credit card account. In the case of a primary customer, the user 9 can access the account, review the transaction history, edit the credit limit, edit the MCCs and/or transaction restrictions or approvals, etc. In the case of a dependent customer, the user 9 can access the account, review the transaction history, view the credit limit, view the transaction restrictions or approvals, etc. through the privacy and security offered by the online banking application 17.

As further illustrated in FIG. 1, the dependent credit systems 20 are located on the dependent credit servers 6. The dependent credit systems 20 generally comprise a communication device 22, a processing device 24, and a memory device 26. The processing device 24 is operatively coupled to the communication device 22 and the memory device 26. The processing device 24 uses the communication device 22 to communicate with the network 2, and other devices on the network 2, such as, but not limited to, the online banking server 4, other bank servers 5, merchant systems 7, and/or user computer systems 8. As such, the communication device 22 generally comprises a modem, server, or other device(s) for communicating with other devices on the network 2.

As illustrated in FIG. 1, the dependent credit systems 20 comprise computer-readable program instructions 28 stored in the memory device 26, which in one embodiment includes the computer-readable instructions 28 of a dependent credit application 27. In some embodiments, the memory device 26 includes a datastore 29 for storing data related to the dependent credit system 20, including but not limited to data created and/or used by the dependent credit application 27, such as dependent customer restrictions or approvals.

The dependent credit application 27 allows the primary customers to establish, edit, and view dependent credit accounts through the online banking application 17. The dependent credit application 27 stores the limits for the dependent credit card that are established by the primary customers. As used herein, "limits" may be established by specifying restrictions or approvals. In other words, the default may be unlimited use by the dependent customer except for noted restrictions established by the primary customer, no permitted use by the dependent customer except for permitted use explicitly defined by approvals established by the primary customer, or a combination of restrictions and approvals. Furthermore, when a user 9 makes a purchase at a merchant, the merchant systems 7 communicate with the dependent credit system 20 and the dependent credit application 27 accepts or denies the purchase made by the user 9 depending on the limits the primary customer has put on the dependent credit card. The dependent credit application 27 stores any transactions that were made or denied for display in the transaction history interface 600. The dependent credit application 27 allows the primary customers and dependent customers to access the dependent credit card account through the online banking application 17 in order to view any transactions that were processed or prevented due to the imposed limits, such a MCCs, UPCs, Stock Keeping Units, and/or other limits. In some embodiments of the invention the dependent credit application 27 may include, be replaced by, or work in conjunction with a dependent debit application. In these embodiments the dependent debit application would work in the same or similar way as described herein for the dependent credit application 27. For example the dependent debit application would store the limits for the dependent debit card established by the primary customer, communicate with the merchant systems 7 when users 9 made a transaction with the dependent debit card, approve or deny the transaction based on the limits, and store the transactions approved or denied for display to the users 9.

MCCs or other identifiers can be assigned to types of businesses, such as liquor stores, gambling establishments, clothing stores, restaurants, etc. or they can be assigned to specific stores within the types of stores. In some embodiments the MCCs for a specific store or type of store are assigned to each card scanner for the store. In some embodiments MCCs, UPCs, or other identifiers are assigned to products. Therefore, when the dependent customer uses the dependent credit card at a card scanner at a store to purchase a product, the scanner and/or the merchant system 7 sends the MCC or identifier related to the store and/or UPC or identifier related to the product to the dependent credit application 27. The dependent credit card application 27 checks the MCCs, UPCs, and/or other identifiers against the list of blocked/approved MCCs, UPCs, and/or other identifiers and denies the purchase if the purchase violated a limit imposed by the primary customer. In some embodiments limits can be placed on certain stores, restaurants, websites, etc. that the primary customer wants to block/approve, without using the MCCs, UPCs, and/or other identifiers. The name of the particular business, the website address, uniform resource locator ("URL"), or other business or website identifier may be added to the blocked/approved list associated with the dependent credit card account, so that when a customer tries to make a purchase using the dependent credit card at the blocked/approved store the transaction is denied/accepted as the case may be. The dependent credit card application 27, allows the primary customer to control the types and amounts of purchases that the dependent card holder can make with the dependent credit card.

As further illustrated in FIG. 1, the user systems 30 are located on the user computer systems 8. The user systems 30 generally comprise a communication device 32, a processing device 34, and a memory device 36. The processing device 34 is operatively coupled to the communication device 32 and the memory device 36. The processing device 34 uses the communication device 32 to communicate with the network 2, and other devices on the network 2, such as, but not limited to, the online banking server 4, dependent credit server 6, merchant systems 7, and/or other bank servers 5. As such, the communication device 32 generally comprises a modem, server, or other devices for communicating with other devices on the network 2, and a display, camera, keypad, mouse, keyboard, microphone, and/or speakers for communicating with one or more users 9. The user system 30 may include, for example, a personal computer, a tablet, a mobile device (i.e. phone, or personal display device ("PDA")) or other devices, etc. In some embodiments, user system 30, such as the mobile device or other devices could include a data capture device that is operatively coupled to the communication device 32, processing device 34, and the memory device 36. The data capture device could include devices such as, but not limited to, a scanner device, image capture device, wireless data capture device (i.e. radio frequency identification ("RFID") device, global positioning satellite ("GPS") device, etc.), which can be used by a user 9 to capture information from a product or store, set limits, and/or prevent transactions, as explained in further detail later.

As illustrated in FIG. 1, the user systems 30 comprise computer-readable program instructions 38 stored in the memory device 36, which in one embodiment includes the computer-readable instructions 38 of a web browsing application 37. In some embodiments, the memory device 36 includes a datastore 39 for storing data related to the user system 30, including but not limited to data created and/or used by the web browsing application 37. The web browsing application 37 allows the user 9 to communicate with the online banking application 17 in order to accesses the user's dependent credit card account through the dependent credit application 27. In other embodiments, a specific application specifically configured to communicate with the online banking application is used in lieu of a generic web browsing application 37. In some embodiments of the invention, wherein the user system 30 includes a data capture device 36, the memory device 36 may include computer readable instructions 38 of a data capture application, which either alone, through the web browsing application 37, or through another application, communicates with the dependent credit application 27, online banking application 17, or other applications. The data capture application allows a primary customer to capture information about a product or store, and set limits on the product or store, which can be transferred to the dependent credit application 27. The data capture application also allows a dependent customer to capture information about a product or store and check with the dependent credit application 27 if he is allowed to make a transaction at the store or for the product.

The other bank servers 5 are operatively coupled to the online banking server 4, dependent credit server 6, merchant systems 7, and user computer systems 8 through the network 2. The other bank servers 5 have systems with devices the same or similar to the devices described for the online banking system 10, dependent credit system 20, and user systems 30 (i.e. communication device, processing device, memory device with computer-readable instructions, datastore, etc.). Thus, the other bank servers 5 communicate with the online banking system 10, dependent credit system 20, merchant systems 7, and user system 30 in the same or similar way as previously described with respect to each system. The other bank servers 5, in some embodiments, are comprised of systems and devices that store and access account information or other information within or outside of the bank.

The merchant systems 7 are operatively coupled to the online banking server 4, dependent credit server 6, user computer systems 8, and other bank servers 5 through the network 2. The merchant systems 7 have systems with devices the same or similar to the devices described for the online banking system 10, dependent credit system 20, and user system 30 (i.e. communication device, processing device, memory device with computer-readable instructions, datastore, etc.). Thus, the merchant systems 7 communicate with the online banking system 10, dependent credit system 20, and/or user system 30 in the same or similar way as previously described with respect to each system. The merchant systems 7 can be computer systems that incorporate scanners, manual input devices, or other data reading devices that can read and capture information embedded in credit cards or other payment devices through magnetic strips, radio frequency identification tags, other wireless transmitters, other scannable features, manually inputted information, etc. The information captured by the merchant systems 7 from the credit cards or other payment devices allows the merchant system 7 to charge the credit account of the user 9. For example, the merchant systems 7 can be registers located in a store, Internet websites that are accessed by the user computer systems 8 remotely, etc., which allow the user 9 to make purchases from the merchant using the dependent credit card. Information on or related to the dependent credit card is captured at the store or on the website and transferred to the dependent credit system 20.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a dependent credit card process 200, in accordance with an embodiment of the present invention. As illustrated in block 202 of FIG. 2, the primary customer applies for a dependent card on behalf of or along with the dependent customer. In some embodiments of the invention the primary customer can fill out application paperwork and mail the application into the financial institution or company offering the dependent credit card. In other embodiments, the primary customer can apply over the telephone, instant message, e-mail, etc. for a dependent credit card. In the embodiment disclosed herein, the primary customer applies for the dependent credit card through the primary customer's online banking account using the online banking application 17 and web browsing application 37. It is understood that embodiments of the present invention may work equally well in applying for a dependent credit card through various channels. In order to apply for credit through the primary customer's online banking account the primary customer first has to sign into the primary customer's online banking account and the online banking application 17 has to authentic the primary customer as the correct customer for the corresponding online banking account.

After the primary customer is authenticated, the online banking application 17 displays the online banking home page interface 300, as illustrated in FIG. 3. In some embodiments, as illustrated in FIG. 3, the online banking home page interface 300 has a Bank Accounts section 310, a Customer Service Section 320, and a Dependent Credit Card Information section 330. The primary customer can navigate the Bank Accounts section 310 to review and analyze the accounts that the primary customer has with the bank. In some embodiments of the invention, if the primary customer has already been approved for a dependent credit card, the Bank Accounts section 310 may have a link for the dependent credit card account. The Customer Service section 320 allows the primary customer to find, receive, and ask for help related to various topics within the bank. As illustrated by the Dependent Credit Card section 330, the primary customer may select a dependent credit card link 332 in order to apply for the dependent credit card.

After selecting the dependent credit card link 332 the primary customer is taken to the account interface 400 in the account tab 402, as illustrated by FIG. 4. As previously discussed, applying for a dependent credit card through the online banking system is one of many ways that a primary or dependent customer can apply for a dependent credit card. As illustrated in the account interface 400 there is a primary customer section 410 and a dependent customer section 440. In the primary customer section 410 the primary customer enters personal information, such as, but not limited to, the primary customer's name 412, address 414, date of birth 416, social security number (SSN) 418, phone 420, e-mail 422, income 424, other income 426, total household income 428, employment status 430, and bank accounts 432 held with the financial institution. In other embodiments of the invention the primary customer will be required to provide additional information, such as, but not limited to, copies of pay stubs, accounts and corresponding balances located at other financial institutions, outstanding debt, etc. in order for the bank to make an informed decision regarding the credit worthiness of the primary customer. In other embodiments of the invention, the primary customer also fills in the dependent customer section 440 of the application with the dependent customer information. In some embodiments of the invention, the primary customer provides information such as, but not limited to, the dependent customer's name 442, address 444, date of birth 446, SSN 448, relationship to the primary customer 450, phone 452, and e-mail 454. In some embodiments the primary customer also can add another dependent customer to the dependent credit card by selecting the add another customer button 462, which allows the primary customer to add more than one dependent customer to the dependent credit card account. In other embodiments of the invention the primary customer can also apply for credit protection or a balance transfer for the account using the credit protection button 464 or the balance transfer button 466. When the primary customer has completed the application the primary customer selects the Apply For Credit button 470. In other embodiments of the invention, the account information in the account interface 400 used to apply for the dependent credit card can be updated and saved using the Save Changes button 472 whenever the information for the primary customer and/or the dependent customer changes.

In some embodiments the dependent customer may log into his online banking account to participate in the application process, such as to complete the dependent customer section 440. In some embodiments of the invention the dependent customer may fill out the dependent customer section 440 first and ask a person to act as the primary customer by having the person sign into the primary customer's online banking account to fill out the rest of the application. In other embodiments of the invention, the dependent customer logs into the online banking account after the primary customer has filled out the primary customer section 410 of the application. In some embodiments of the invention the primary customer and dependent customer must sign into the online banking account before the dependent credit card is issued in order to agree to the terms and conditions of the card. In other embodiments of the invention the primary customer or dependent customer can fill out or apply for a part of or all of the dependent credit card application through another channel, such as, in person at the bank, over e-mail, over instant message, etc.

As illustrated by block 204 in FIG. 2, after the primary customer has applied for the dependent credit card, the bank will determine whether or not to extend credit to the primary customer and the dependent customer based on the financial information of the primary customer only. In some embodiments of the invention, the financial information of the dependent customer is taken into account by the financial institution. However, since in some embodiments the primary customer is the only customer ultimately responsible for any debt acquired by the dependent customer, the financial institution may only be concerned with the ability of the primary customer to pay the dependent credit card bill. As illustrated by block 206, if the financial institution feels that the primary customer is too much of a risk to extend credit to, then the financial institution may deny the primary customer's application for the dependent credit card. As illustrated by termination block 226, when the primary customer does not qualify for the dependent credit card the dependent credit card process 200 may be terminated.

As illustrated by block 208, if the financial institution determines that the risk is acceptable in extending credit to the primary customer, then the primary customer may qualify for the dependent credit card. In some embodiments of the invention, as illustrated by block 210, the financial institution determines the maximum credit limit based on the credit worthiness of the primary customer. Furthermore, in some embodiments of the invention, as illustrated in block 212, the financial institution sets the initial credit limit of the dependent credit card equal to the maximum credit limit and also sets up the dependent credit card with no other limits. In some embodiments of the invention the primary customer can set the credit limit, blocked/approved MCCs, and/or create other limits when applying for the dependent credit card, and the financial institution sets the limits automatically after the customer is approved for the dependent credit card.

After being approved, the primary customer can edit the credit limit, block/approve certain transactions, or create other limits for the dependent customer by, for example, selecting particular MCCs, stores, and/or products as illustrated by block 214. If the primary customer wants to edit the credit limit, the blocked/approved MCCs, stores, and/or products, then the primary customer can do so through a number of channels such as, but not limited to, over the telephone, through e-mail, through instant message, in person through speaking with a customer representative, through a kiosk or ATM, and/or over the internet, as illustrated in block 216. In some embodiments the primary customer can edit the credit limit, block/approve specific MCCs, stores, and/or products using the primary customer's online banking account. FIG. 5 illustrates a dependent credit limit interface 500 in the set limit tab 502. The dependent credit limit interface 500 has a credit limit section 510 that includes a total limit 512, a MCC limit section 520, a store limit section 530, and a search section 540. The primary customer can set the total credit limit for the dependent card if the primary customer thinks that the maximum credit limit determined by the financial institution is too high for the dependent customer. For example, the financial institution may determine that the credit limit for the dependent customer based on the credit worthiness of the primary customer should be a maximum of five thousand (5,000) dollars. The primary customer may feel that this credit limit is too high for the dependent customer. Therefore, the primary customer has the option to set the credit limit at a lower amount, for example two thousand (2,000) dollars, by entering the amount in the total limit section 512 of the dependent credit limit interface 500.

In other embodiments of the invention, the primary customer can control the types of purchases that the dependent customer can make. In one embodiment the primary customer controls the types of purchases by adding MCCs to a list of blocked MCCs. MCCs are industry standard codes assigned to types of stores, individual stores, or potentially in some cases actual products, in an effort to categorize the types of stores, stores, and/or products into various groups. As illustrated in FIG. 5, the MCC limit section 520 lists in some embodiments the MCC 522, the type 524 of store, actual store, or product, the limit 526 on the related MCC, and the time 528 for the extent of the limit. Therefore, the primary customer can add different MCCs, such as, but not limited to MCCs for grocery stores, men's and women's clothing stores, electronic sales, eating places and restaurants, package stores (for beer, wine, and liquor), health and beauty shops, etc. to a blocked list of purchases that the primary customer wants to regulate or block the dependent customer from making. In some embodiments of the invention, adding the MCCs to the blocked list completely prevents the dependent customer from making purchases at the store or for a product. In other embodiments, as illustrated in FIG. 5, the primary customer can place a particular monetary limit on the amount of money the dependent customer can spend in a type of store, in a specific store, or on a product. In some embodiments, the primary customer can place time limits on the monetary limits for particular MCCs. For example, as illustrated in FIG. 5, the primary customer can add the MCC for grocery stores to the blocked list and set a monetary limit of five hundred (500) dollars to the grocery store, therefore preventing the dependent customer from spending more than five hundred (500) dollars at a grocery store. Furthermore, as illustrated in FIG. 5, the primary customer can also set a time limit for the monetary limit, such as a time limit of one month, therefore, in this example, preventing the dependent customer from spending more than five hundred (500) dollars at a grocery store in a one month period. Example time periods include a single transaction, a predefined number of transactions, a day, a number of days, a month, a year, a number of years, etc.

In some embodiments of the invention the primary customer can put different limits on the same MCCs. For example, as illustrated in FIG. 5, the primary customer can also set a limit of one hundred (100) dollars a day at a grocery store, therefore preventing the dependent customer from spending both more than one hundred (100) dollars a day and five hundred (500) a month at a grocery store.

If the primary customer does not want the dependent customer to be able to purchase anything related to a particular MCC, in one embodiment the primary customer can set a limit of zero (0) dollars for the particular MCC. For example, if the primary customer wants to prevent a dependent customer from purchasing any products at a package store, such as beer, wine, and liquor, the primary customer sets a limit of zero (0) dollars on the MCC related to package stores generally.

In other embodiments of the invention, the primary customer can add specific stores to the blocked list if the primary customer wants to limit the transactions the dependent customer can make. For example, as illustrated in FIG. 5, the primary customer can prevent the dependent customer from purchasing anything from a particular pub. Furthermore, for example, as illustrated in FIG. 5, the primary customer can set a limit of five hundred (500) dollars at the campus bookstore, which allows the dependent customer to purchase the necessary books for classes, but not other items at the campus bookstore.

In other embodiments of the invention, not illustrated in FIG. 5, the dependent credit limit interface 500 can include an approved list in lieu of or in addition to the blocked list. For example, the approved list allows the primary customer to limit the transactions the dependent customer can to make to only the stores or products on the approved list. The approved list works in much the same way as the blocked list described with respect to FIG. 5, in that the primary customer can set limits on the stores and products, such as, but not limited to monetary and time limits by using MCCs, stores, products, or other identifiers. The difference between the blocked list and the approved list being that the dependent customer can make any type of transaction outside of any store or product on the blocked list, while the approved list only allows the dependent customer to make transactions that are included on the approved list.

In order to add the MCCs, or other particular stores to the blocked/approved list, in one embodiment, the primary customer can enter the MCC, type of store, store name, address, etc. directly into the blocked/approved list. In other embodiments, the primary customer can enter the MCC, type of store, store name, address, etc. into a search feature and thereafter into the blocked/approved list after each is found through the search feature. As illustrated in the search section 540 of FIG. 5, the primary customer can enter the name of a store into the name section 542, the address of the store into the address section 544, the MCC into the MCC section 546, or the type of store into the type section 548, and thereafter select the search button 550 to identify the store or MCC based on the search criteria. When the correct store or MCC is identified the primary customer can select the add button 552 to add the store or MCC to the blocked list. Thereafter, the primary customer can set the monetary limits and time limits for each MCC or store as previously described. In other embodiments of the invention, the blocked/approved lists or the search section 540 includes drop-down features or browsing lists that contain the store name, store types, store identifiers, product names, products types, and/or product identifiers that allow a primary customer to identify the stores or products that the primary customer wants to add to the blocked/approved lists.

In some embodiments of the invention the primary customer can add a range of MCCs to the blocked list, so that the dependent customer does not need to add every individual MCC related to a particular industry to the blocked/approved list. For example, the primary customer can add the group of MCCs from three-thousand (3000) to three-thousand two-hundred and ninety-nine (3299) which covers "Airlines" in order to limit the transactions the dependent customer can make with merchants related to airlines.

In some embodiments of the invention, the primary customer can set an overall credit limit for a period of time, such as but not limited to per day, number of days, week, number of weeks, months, number of months, year, etc. The primary customer can then limit stores or products based on type of store, store, type of product, product, MCC, UPC, and/or other identifier as a percentage of the overall credit limit for a specific period of time. For example, the credit limit on a bookstore may be set by the primary customer at five-hundred (500) dollars. Thereafter, the primary customer can set a limit that the dependent customer can spend one-hundred (100) percent of the credit limit in September, fifty (50) percent of the credit limit in October, and zero (0) percent the rest of the year.

In some embodiments of the invention the dependent credit limit interface can be populated by the primary customer using drag and drop features in order to set the limits on the total credit as well as the stores and products in the blocked/approved lists in the dependent credit account.

In some embodiments of the invention, instead of creating transaction limits that either block/approve transactions made by dependent customers, other limits can be applied to stores or products that serve simply as notification limits instead of denial/acceptance limits. Therefore, in some embodiments, the primary customer allows the dependent customer to make various types of transactions at stores or for products, but sets notification limits in order to be notified when the dependent customer makes the transactions. In these embodiments, the primary customer can track the transactions made by the dependent customer without having to limit the types of transactions made by the dependent customer.

In some embodiments of the invention UPCs relating to specific products or types of products, or other product identifiers, such as Stock Keeping Units, etc., can be used in addition to or instead of MCCs. For example, UPCs are codes that are assigned to each product in the market. The UPCs have a bar code assigned to each UPC so when the product is purchased computer systems identify the product for purposes such as pricing, accounting, inventory, etc. Products can be added to the blocked/approved list in the dependent credit limit interface 500 using a UPC or other identifier. For example, the MCC limit section 520 can include sections, or be replaced by sections, for adding UPCs or other product or identifier limits to a blocked/approved list of products. In addition, in some embodiments of the invention, monetary limits and/or time limits can be applied to the blocked/approved list of products using the UPCs or other product identifiers, as was previously described with respect to the MCC limits.

In still other embodiments of the invention other identifiers can be used in place of or in conjunction with MCCs, UPCs, or other identifiers. For example 2D barcodes, Quick Response codes ("QD codes"), RFID tags, etc. that are assigned to products could be added to a blocked/approved list of products in the dependent credit account. Therefore, products that the dependent customer tries to purchase, which use these identifiers would be checked by the dependent credit application 27 against the blocked/approved list before the transaction could be approved.

As illustrated by block 218 in FIG. 2, after the primary customer edits the initial credit limit or blocked/approved stores or products, the primacy customer saves the edits and they are stored in the dependent credit system 20. After the initial credit limits and blocked/approved stores and products are saved the disclosures and terms of use are sent to the primary customer and the one or more dependent customers, as illustrated by block 220. The disclosures and terms of use outline the how the primary customer and dependent customer may use the dependent credit card and manage the dependent credit account. As illustrated by block 222, after the disclosures and terms of use are sent and agreed to, the dependent customer can begin using the dependent credit card within the limits set by the primary customer.

At any time during the use of the dependent credit card the primary customer or dependent customer can log into their online banking account to view the transactions made on the card. In some embodiments, the dependent customer has a separate online banking account, login name, and password from the primary customer. This allows the dependent customer to view any transactions on the card, but prevents the dependent customer from being able to make changes to the maximum credit limit or the blocked/approved MCCs, store, or products. FIG. 6 illustrates a transaction history interface 600 located in the transactions tab 602 that allows the primary customer to view the transactions made on the dependent credit card. In some embodiments of the invention the same or similar transaction history interface is also available for viewing by the dependent customer in the dependent customer's online banking account. As illustrated in FIG. 6, the transaction history interface 600, in some embodiments, has a transaction history section 610 that lists the transaction date 612, the transaction description 614, the transaction customer 616 that made the transaction, the transaction amount 618, the total account balance 620, and the limit balance 622 for the type of transaction. When the dependent customer tries to make a transaction that does not meet the limits set by the primary customer the transaction is denied. For example, as illustrated in FIG. 6, the grocery store transactions made on Jun. 8th, 2010 were denied because the amount was more than the limit of one-hundred (100) dollars in a single day for grocery stores.

In some embodiments, the primary customer can also make purchases with the dependent credit card. In one embodiment, the primary customer and dependent customer both have credit cards with different numbers that are linked to the dependent credit card account. In other embodiments, the primary customer and dependent customer have credit cards with the same account number, but have identifiers that distinguish them from each other when making purchases. In other embodiments, the primary customer does not have a credit card linked to the dependent credit card account, and thus even though the primary customer has control over the account the primary customer cannot make purchases using the account. As illustrated in FIG. 6 in some embodiments the primary customer is not subject to the limits that the primary customer placed on the dependent customer when the primary customer is making a purchase with the dependent credit card. As illustrated by the transaction made on Jun. 6th, 2010 in FIG. 6, the primary customer is able to make a purchase at the clothing store after the dependent customer has already reached the spending limit on clothing stores set by the primary customer. In some embodiments the dependent credit card limit can be set to apply to the primary customer as well as the dependent customer. As illustrated by the payment transactions made on Jun. 15th, 2010 both the primary customer and dependent customer can make payments on the card. As previously discussed, having a credit card that can be paid in part by the dependent customer can help the dependent customer build good credit history when the dependent customer might have otherwise not been able to be approved for a credit card.

In the case where the dependent payment device is a dependent debit card, the settlement process would work differently than as described for the dependent credit card. Instead of carrying a balance on the dependent credit card, which is paid off though billing cycles by the users 9, in the case of the dependent debit card the transaction payment is deducted from an account associated with the dependent debit card when the transaction occurs, or shortly thereafter. Therefore, a dependent debit application may not only check the limits on a dependent debit card when a transaction is made using the dependent debit card, but may also check the available balance in the dependent debit account when the transaction is made.

In other embodiments of the invention, the primary customer and/or the dependent customer can request to be notified when a particular limit is close to being reached or has been reached. For example, in some embodiments the primary customer or dependent customer can request a notification from the dependent credit account when the dependent customer has reached a percentage of a monetary limit, such as 80 percent of the money that can be spent at grocery stores. This feature allows the primary customer and/or the dependent customer to be aware of the spending of the dependent customer. Thus, allowing the primary customer to change the limits if necessary and/or allowing the dependent customer to control his spending or request that the primary customer to change the limits. These features also allow the primary customer and the dependent customer to pay down certain limits before they reach the maximum limit in order to prevent additional transactions from being denied. In some embodiments the primary customer can set notification alerts in order to be notified when the dependent customer makes a transaction at a store or for a product, type of store or product, range of stores or products, etc, in order to make payments on the transactions before the end of the billing cycle. In some embodiments, the primary customer may want to pay off some transactions immediately or sometime before the end of the billing cycle, therefore the notification alerts allow the primary customer to manually pay off certain transactions made by the dependent customer. Furthermore, in some embodiments the primary customer can link the dependent credit card account to another account and set up automatic payments to occur at various time for various transactions made by the dependent customer.

As illustrated by block 224 in FIG. 2, the primary customer can at any time log into online banking and edit the limits set on the dependent credit card. For example, if the primary customer originally set a limit of five hundred (500) dollars at the campus bookstore so the dependent customer could buy books for classes, the primary customer can change the limit to zero (0) dollars after the dependent customer has purchased the books, in order to prevent the dependent customer from making purchases at the campus bookstore for other products, such as clothing or other supplies. When the primary customer is done editing the limits the process may terminate, as illustrated by termination block 226. In some embodiments of the invention, when the primary customer first sets up the limits on the dependent credit card and/or at any point thereafter when the primary customer changes the limits on the dependent credit card a notification can be sent to the dependent customer identifying the limits that were set or changed by the primary customer. In some embodiments the dependent customer can be notified of any limits set or changed by the primary customer through text message, e-mail, telephone call, or any other like communication channel.

In the embodiments where there is more than one dependent customer under the account of the primary customer, each dependent customer may have their own set limit interface 500 and transaction history interface 600. The separate interfaces for each dependent customer allows the primary customer to better manage each account because the primary customer can set limits and view the transaction history of each dependent customer individually based on the needs of each of the individual dependent customers.

FIG. 7 provides a process map illustrating a dependent credit card transaction process 700, in accordance with one embodiment of the present invention. As illustrated by block 702 in FIG. 7, a customer first tries to make a purchase at a physical store of a merchant or through an online store remotely over the Internet using the dependent credit card. As illustrated by block 704 the dependent credit card is swiped through a card scanner, is manually entered, automatically populated, wirelessly entered, etc. into a merchant system 7 either at the physical store or remotely through an online store over the Internet. The merchant system 7 communicates with the dependent credit system 20 through the network 2, as illustrated by block 706. As illustrated by decision block 708, the dependent credit system 20 identifies if the dependent credit card being used by the customer belongs to the primary customer or to one of the dependent customers (if there is more than one dependent customer) using the credit card numbers or other identifier. The identifier could be printed on the card and/or electronically captured in a magnetic strip, a radio frequency identification tag, etc. that is on or in the card. If the customer making the purchase is the primary customer and if the card has not reached the maximum balance, then as illustrated by termination block 720 the transaction is allowed to proceed. If however, the customer trying to make the purchase is the dependent customer, then as illustrated by block 710 the dependent credit system 20 cross references the merchant and/or product the dependent customer is trying to purchase with the blocked list of merchants or products in the primary customer's account for the particular dependent customer. As previously explained, when the merchant system makes the request to connect to the dependent credit system 20, or sometime thereafter, identifier information about the merchant and/or product trying to be purchased, such as but not limited to MCCs, store names, store addresses, store types, UPCs, product names, product types, etc. are received by the dependent credit system 20. The dependent credit application 27 utilizes the identifier information to determine if the merchant and/or products have been blocked by the primary customer. As illustrated by decision block 712 if the merchant and/or products are not on the blocked list then the transaction is allowed to proceed (again if the maximum credit limit has not been reached). If however, as illustrated by decision block 714, the merchant and/or product is on the blocked list the dependent credit application 27 determines if the merchant and/or product is subject to any monetary limits, such as but not limited to an amount that the dependent customer cannot exceed when making a purchase at the merchant and/or for the product. If the purchase being made by the dependent customer is not within the monetary limit then the transaction is denied by the dependent credit application 27. If however, the purchase is within the monetary limit then as illustrated by decision block 716, the dependent credit application 27 determines if the purchase is within the time limits set by the primary customer. For example, the purchase could be within the monetary limits for a one-time purchase, but the purchase could push the dependent customer over the limit for the number of purchases made within a month and/or the total amount of all the purchases made within the month. If the purchase being made by the dependent customer is not within the time limits then the transaction is denied, as illustrated by termination block 718. If however, the purchase being made by the dependent customer is within the time limits then the transaction is allowed to proceed as illustrated by decision block 720.

As previously discussed in the case where the dependent payment device is a dependent debit card, the settlement process would work differently than as described for the dependent credit card. Therefore, in some embodiments, FIG. 7 would also include a step wherein the dependent debit application may also check the available balance in the dependent debit account when the transaction is made, and thus approve or deny the transaction based on whether or not the available balance can cover the transaction amount.

Regardless of whether or not the transaction was approved or denied, in some embodiments the transaction is posted and saved to the transaction history section, as illustrated in the transaction history interface 600, in order to allow the dependent customer and, more importantly, the primary customer to see the purchases that the dependent customer tried to make using the dependent credit card.

In other embodiments of the invention, the process illustrated and described with respect to FIG. 7 can be applied equally well for an approved list instead of a blocked list, with some changes. For example, after it is determined that user 9 of the dependent card is the dependent customer, the dependent credit system 20 can cross reference the merchant and products being purchased with the approved list. If the merchant or product is not on the approved list then the transaction would terminate. If the merchant or product was on the approved list, then the dependent credit system 20 would determine if the transaction is within any monetary limits and time limits. If not, the transaction would terminate. However, if the transaction is within the monetary limits and the time limits then the dependent credit system 20 would allow the transaction to proceed.

In some embodiments of the invention, a primary customer can utilize a mobile device, which includes a data capture system, to set limits on stores directly at the store location. In one embodiment, the primary customer can utilize the mobile device, having a data capture system comprising a data capture device and a data capture application, such as but not limited to a GPS device and application, a scanning device and application, an image capture device and application, and/or a wireless transmitter device and application. For example, in one embodiment, if the primary customer is in a location, such as a store, restaurant, bar, etc., which the primary customer would like to add to the list of blocked/approved stores, the primary customer can use the mobile device to add the store to the blocked/approved list. In some embodiments, the primary customer can log into his dependent credit account through the online banking application 17 using a mobile device, such as but not limited to a PDA. The mobile device may have a GPS device and application that can determine the location of the primary customer. Therefore, while the customer is logged into his dependent credit account the customer can select a function in the dependent credit account that adds the customer's current location to blocked/approved list. The dependent credit application 27 may add the store automatically or it may display the location to the customer on the mobile device for the primary customer's approval. The dependent credit application 27 can save the store identified by the GPS application to the list of blocked/approved stores. In other embodiments, instead of using GPS to identify the store location, the primary customer can take an image of the store, store name, address, or other identifier, and an image capture application can use the image or data captured in the image to identify the store by cross-referencing the image or data of the store with information stored by the bank or other servers over the network 2. When the image capture application identifies the store the dependent credit application 27 can add the store to the blocked/approved list automatically or it may display the store on the mobile device for the primary customer's approval. In still other embodiments of the invention the primary customer can use a wireless transmitter device and wireless transmitter application in the mobile device to capture information about a store identifying the store by type, name, address, etc. in order to add the store to the a list of blocked/approved stores in the dependent credit account. The wireless transmitter device can receive information about a store from a transmitter, such as but not limited to a RFID tag, located at the store. When the wireless transmitter application identifies the store the dependent credit application 27 can add the store to the blocked/approved list automatically or it may display the store on the mobile device for the primary customer's approval to add the store to the blocked/approved list of stores. In still other embodiments of the invention the primary customer can scan a barcode, or other identifier, using a scanning device and scanning application in the mobile phone, to identify the store location. The dependent credit application 27 can utilize the scanned information to add the store to the list of blocked/approved stores.

In some embodiments of the invention, a primary customer can utilize a mobile device, which includes a data capture device, to set limits on products located directly at the store or at any other location. For example, in one embodiment, the primary customer can identify a product that the primary customer would like to add to the blocked/approved list. The primary customer can log into his dependent credit account through the online banking application 17 using a mobile device, such as but not limited to a PDA. Therefore, while the customer is logged into his dependent credit account the customer can select a function in the dependent credit account that adds a product to the blocked/approved list of products using a scanning device. Thereafter, the primary customer can use a scanning device and scanning application in the mobile device to capture information on the product, associated packaging, or associated marketing materials identifying the product by name, MCC, UPC, or other identifier in order to add the product to a list of blocked/approved products in the dependent credit account. For example, in one embodiment the scanning device can be a laser scanner that captures the barcode UPC of the product and adds the product to the blocked/approved list of products. The dependent credit application 27 may add the product automatically or it may display the scanned product to the customer on the mobile device for the primary customer's approval to add it to the blocked/approved list. In other embodiments of the invention, while the customer is logged into his dependent credit account the customer can select a function in the dependent credit account that adds a product to the blocked/approved list of products using an image capture device. Thereafter, the primary customer can use an image capture device and image capture application in the mobile device to capture information on the product, associated packaging, or associated marketing materials identifying the product by name, MCC, UPC, or other identifier in order to add the product to the a list of blocked/approved products in the dependent credit account. The image capture application can use image or data obtained from the image, through character recognition software or other software, for cross-referencing with images or data of products store by the bank or other servers over the network 2. When the image capture application identifies the product related to the image captured by the primary customer the dependent credit application 27 can add the product to the blocked/approved list automatically or it may display the product on the mobile device for the primary customer's approval to add the product to the blocked/approved list of products. In still other embodiments of the invention the primary customer can use a wireless transmitter device and wireless transmitter application in the mobile device to capture information on a product, associated packaging, or associated marketing materials identifying the product by name, MCC, UPC, or other identifier in order to add the product to the a list of blocked/approved products in the dependent credit account. The wireless transmitter device can receive information about a product from a transmitter, such as but not limited to a RFID tag on or near the product. When the wireless transmitter application identifies the product the dependent credit application 27 can add the product to the blocked/approved list automatically or it may display the product on the mobile device for the primary customer's approval to add the product to the blocked/approved list of products.

Furthermore, in other embodiments of the invention the primary customer can also set other limits on the stores or products added to the blocked/approved list using the mobile device, such as but not limited to monetary limits, time limits, etc. as previously explained herein.

In other embodiments of the invention the dependent customer can utilize the a mobile device, which includes a data capture device and a data capture application, to check to see if limits have been applied by the primary customer on a store at which the dependent customer is located or on a product in which the dependent customer is interested. This embodiment can work in the same or similar way as described with respect to the primary customer setting limits on stores and products using a mobile device herein. For example, the dependent customer can utilize a mobile device, having a data capture system comprising a data capture device and data capture application, such as but not limited to a GPS device and application, a scanning device and application, an image capture device and application, and/or a wireless transmitter device and application. The dependent customer can use the data capture device and application to capture information about a store, such as the store MCC, store type, name, address, etc. and/or information about a product, such as but not limited to UPC, product name, product type, other identifier, etc. and use the information to determine if the primary customer placed any limits on the dependent store or product. In some embodiments, the dependent customer can log into his dependent credit account through the online banking application 17 using a mobile device, such as but not limited to a PDA. The data capture device and application captures the information about the store and product, as previously discussed, and the dependent credit application 27 determines if the store or product is on the blocked/approved list of stores and products. Thereafter, the dependent credit application 27 can display to the dependent customer any limits on the store or product through the dependent credit account on the mobile device. In this way the dependent customer can check if a transaction would be allowed at the store or on the product before making an effort to purchase a product.

In other embodiments of the invention, instead of having to be logged into the dependent credit account in order for the dependent credit application 27 to display to the user 9 on the mobile device if the store or product is on the blocked/approved list, the system can work in other ways. For example, after the data capture device captures information about the store or product on the mobile device, the mobile device can send the information to the dependent credit application 27, and the dependent credit application 27 thereafter can send any information regarding limits on the store or product to the user 9 on the mobile device using text messages, e-mail, phone calls, etc.

In some embodiments, when a transaction is being made at the checkout of a store, at a physical store location or on the user computer system 20, the dependent credit application 27 can display the limits, such as the monetary limit, the time limit, etc., as the limits would be if the customer were to make the transaction or not make the transaction. In this way, the dependent customer can determine if a transaction that the he wants to make would go through or if the transaction could prevent other transactions from being made in the future because the dependent customer would be too close to a limit.

In other embodiments, if the proposed transaction being made or inquired by the customer is denied, the dependent customer can have the option of notifying the primary customer asking to lift the limit on the transaction. The notification can come through text message, e-mail, phone call, through the dependent credit account, etc. Thereafter, the primary customer can change the limit permanently, override the limit as a one time exception, or keep the limit the same. An override function allows the primary customer to allow the dependent customer to make certain necessary transactions in times of need or emergency situations that ordinarily would not be allowed. This feature can be implemented through many different types of payment scenarios. For example, in some embodiments the feature could be used if the dependent customer is making a purchase at store checkout, in which the purchase would be denied because it violated a limit. The dependent credit application 27 could notify the primary customer before the transaction is denied, to allow the primary customer to override the limit as a one time exception. In other embodiments, the dependent customer could notify the primary customer through the online banking application that he wants to make a purchase that he knows will be denied in order to get approval for the transaction before the dependent customer tries to make the purchase. For example, the dependent customer could notify the primary customer of a purchase on a product through the mobile device and the primary customer could respond by allowing the transaction. Thereafter, the dependent credit application would allow the one time transaction that does not meet the limits set in the dependent credit account.

In some embodiments of the invention, a reward system can be implemented for the dependent credit account. In addition to limits set by the primary customer, the primary customer may want to set spending goals that are lower than the limits in order to control the customer's spending, but leave enough credit available for the dependent customer in case there is an emergency situation. For example, the primary customer may set a limit of five-hundred (500) dollars at the bookstore in case the dependent customer needs supplies from the bookstore, however, the primary customer only really wants the dependent customer to spend three-hundred (300) dollars. In some embodiments the primary customer can set of goal of three-hundred (300) dollars and a limit of five-hundred (500) dollars on the bookstore. If the dependent customer spends less than the goal for the specified time limit then the limit on another store or product can be removed, or increased. For example, the dependent customer can now spend one-hundred (100) dollars at an electronics store. Alternatively, if the dependent customer spends more than the goal then the limit on another store or product can be set or decreased. For example, the dependent customer can no longer make purchases at movie theaters.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A dependent financial transaction system, comprising:
    a memory device;
    a communication device; and
    a processing device operatively coupled to the memory device and the communication device, wherein the processing device is configured to execute computer-readable program code to:
        receive a request from a primary customer to access an online banking application through a mobile device with a data capture device;
        authenticate the primary customer and display the primary customer's accounts through the online banking application, wherein the primary customer's accounts comprise a dependent customer account;
        receive a request from the primary customer to set one or more limits on a store or a product for the dependent customer account, in order to control transactions a dependent customer is permitted to make using a dependent payment device at the store or for the product;
        wherein the request from the primary customer to set the one or more limits on the store or the product for the dependent customer account is received through the use of the data capture device in the mobile device;
        save the one or more limits on the store or the product received from the primary customer in the memory device;
        receive a request from the dependent customer to view the one or more limits on the store or the product;
        allow the dependent customer to view the one or more limits on the store or the product in a limit interface
        receive a request from a merchant to allow the dependent customer to make a transaction using the dependent payment device;
        compare the proposed transaction against the one or more limits stored in the memory device; and
        approve or deny the transaction the dependent customer is trying to make based on the comparison of the transaction against the one or more limits stored in the memory device.

2. The dependent financial transaction system of claim 1, wherein the processing device is further configured to:
    receive an application for the dependent payment device from the primary customer listing a person as the dependent customer.

3. The dependent financial transaction system of claim 1, wherein the one or more limits comprise a transaction prevention limit that controls the transactions made by the dependent customer by preventing the dependent customer from making transactions at the store or for the product.

4. The dependent financial transaction system of claim 1, wherein the one or more limits comprise a transaction allowance limit that controls the transactions made by the dependent customer by allowing the dependent customer to make transactions at the store or for the product.

5. The dependent financial transaction system of claim 1, wherein the one or more limits comprise a monetary limit on an amount the dependent customer can spend at the store or for the product.

6. The dependent financial transaction system of claim 1, wherein the one or more limits comprise a time limit on the transaction the dependent customer can make at the store or for the product.

7. The dependent financial transaction system of claim 1, wherein the processing device is further configured to:
    receive a request from a merchant to allow the primary customer to make a second transaction using the dependent payment device; and
    allow the primary customer to make the second transaction regardless of whether the second transaction meets or does not meet the one or more limits set on the store or the product.

8. The dependent financial transaction system of claim 1, wherein the processing device is further configured to:
    receive a request from the dependent customer to view transaction history; and
    allow the dependent customer to view the transaction history in a transaction history interface.

9. The dependent financial transaction system of claim 1, wherein the processing device is further configured to:
    receive a request from the primary customer to view transaction history; and
    allow the primary customer to view the transaction history in a transaction history interface.

10. The dependent financial transaction system of claim 1, wherein the processing device is further configured to:
receive a request from the primary customer to view the one or more limits on the store or the product; and
allow the primary customer to view the one or more limits on the store or the product in a limit interface.

11. The dependent financial transaction system of claim 1, wherein the one or more limits comprise one or more limits on the store, and wherein the one or more limits on the store are assigned using a Merchant Category Code, a store type, or a store name.

12. The dependent financial transaction system of claim 1, wherein the one or more limits comprise one or more limits on the product, and wherein the one or more limits on the product are assigned using a Universal Product Code, or a Stock Keeping Unit.

13. The dependent financial transaction system of claim 1, wherein the dependent payment device comprises a credit card.

14. The dependent financial transaction system of claim 1, wherein the dependent payment device comprises a debit card.

15. The dependent financial transaction system of claim 1, wherein the dependent payment device is associated with a credit account for which the primary customer is at least partially responsible.

16. The dependent financial transaction system of claim 1, wherein the processing device configured to execute computer-readable program code to receive a request from a primary customer to set one or more limits on a store or a product comprises receiving the request from a data capture device located in a mobile device.

17. The dependent financial transaction system of claim 1, wherein the processing device is further configured to:
notify the dependent customer of the one or more limits when the primary customer sets or changes the one or more limits.

18. The dependent financial transaction system of claim 1, wherein the processing device is further configure to: receive information from a data capture device from the dependent customer regarding a store the dependent customer is located at or a product that the dependent customer is interested in; determine whether the store the dependent customer is located at or the product that the dependent customer is interested in is has an associated limit; and notify the dependent customer when the store the customer is located at or the product that the dependent customer is interested in has an associated limit.

19. The dependent financial transaction system of claim 1, wherein the processing device is further configured to:
notify the primary customer when the transaction the dependent customer is trying to make is denied.

20. A dependent financial transaction method, comprising:
receiving, by a processing device, a request from a primary customer to access an online banking application through a mobile device with a data capture device;
authenticating, by the processing device, the primary customer and displaying the primary customer's accounts through the online banking application, wherein the primary customer's accounts comprise a dependent customer account;
receiving, by the processing device, a request from the primary customer to set one or more limits on a store or a product for the dependent customer account, in order to control transactions a dependent customer is permitted to make using a dependent payment device at the store or for the product; wherein the request from the primary customer to set the one or more limits on the store or the product for the dependent customer account is received through the use of the data capture device in the mobile device;
saving, by the processing device, the one or more limits on the store or the product received from the primary customer in a memory device;
receiving, by the processing device, a request from the dependent customer to view the one or more limits on the store or the product; and
allowing, by the processing device, the dependent customer to view the one or more limits on the store or the product in a limit interface;
receiving, by the processing device, a request from a merchant to allow the dependent customer to make a transaction using the dependent payment device;
comparing, by the processing device, the proposed transaction against the one or more limits stored in the memory device; and
approving or denying, by the processing device, the transaction the dependent customer is trying to make based on the comparison of the transaction against the one or more limits stored in the memory device.

21. The dependent financial transaction method of claim 20, further comprising:
receiving an application for the dependent payment device from the primary customer listing a person as the dependent customer.

22. The dependent financial transaction method of claim 20, wherein the one or more limits comprise a transaction prevention limit that controls the transactions made by the dependent customer by preventing the dependent customer from making transactions at the store or for the product.

23. The dependent financial transaction method of claim 20, wherein the one or more limits comprise a transaction allowance limit that controls the transactions made by the dependent customer by allowing the dependent customer to make transactions at the store or for the product.

24. The dependent financial transaction method of claim 20, wherein the one or more limits comprise a monetary limit on an amount the dependent customer can spend at the store or for the product.

25. The dependent financial transaction method of claim 20, wherein the one or more limits comprise a time limit on the transaction the dependent customer can make at the store or for the product.

26. The dependent financial transaction method of claim 20, further comprising:
receiving a request from a merchant to allow the primary customer to make a second transaction using the dependent payment device; and
allowing the primary customer to make the second transaction regardless of whether the second transaction meets or does not meet the one or more limits set on the store or the product.

27. The dependent financial transaction method of claim 20, further comprising:
receiving a request from the dependent customer to view transaction history; and
allowing the dependent customer to view the transaction history in a transaction history interface.

28. The dependent financial transaction method of claim 20, further comprising:
receiving a request from the primary customer to view transaction history; and
allowing the primary customer to view the transaction history in a transaction history interface.

29. The dependent financial transaction method of claim 20, further comprising:
  receiving a request from the primary customer to view the one or more limits on the store or the product; and
  allowing the primary customer to view the one or more limits on the store or the product in a limit interface.

30. The dependent financial transaction method of claim 20, wherein the one or more limits comprise one or more limits on the store, and wherein the one or more limits on the store are assigned using a Merchant Category Code, a store type, or a store name.

31. The dependent financial transaction method of claim 20, wherein the one or more limits comprise one or more limits on the product, and wherein the one or more limits on the product are assigned using a Universal Product Code, or a Stock Keeping Unit.

32. The dependent financial transaction method of claim 20, wherein the dependent payment device comprises a credit card.

33. The dependent financial transaction method of claim 20, wherein the dependent payment device comprises a debit card.

34. The dependent financial transaction method of claim 20, wherein the dependent payment device is associated with a credit account for which the primary customer is at least partially responsible.

35. The dependent financial transaction method of claim 20, wherein receiving a request from a primary customer to set one or more limits on a store or a product comprises receiving the request from a data capture device located in a mobile device.

36. The dependent financial transaction method of claim 20, further comprising: notifying the dependent customer of the one or more limits when the primary customer sets or changes the one or more limits, through the use of the processor.

37. The dependent financial transaction method of claim 20, further comprising:
  notifying the primary customer when the transaction the dependent customer is trying to make is denied.

38. The dependent financial transition method of claim 20, further comprising: receiving information, from a data capture device from the dependent customer, regarding a store the dependent customer is located at or a product that the dependent customer is interested in; determining whether the store the dependent customer is located at or the product that the dependent customer is interested in is has an associated limit; and notifying the dependent customer when the store the customer is located at or the product that the dependent customer is interested in has an associated limit.

39. A computer program product for a dependent financial transaction system, the computer program product comprising at least one non-transitory computer-readable medium having computer-readable program code portions embodied therein, the computer-readable program code portions comprising:
  an executable portion configured for receiving a request from a primary customer to access an online banking application through a mobile device with a data capture device;
  an executable portion configured for authenticating the primary customer and displaying the primary customer's accounts through the online banking application, wherein the primary customer's accounts comprise a dependent customer account;
  an executable portion configured for receiving a request from the primary customer to set one or more limits on a store or a product for the dependent customer account, in order to control transactions a dependent customer is permitted to make using a dependent payment device at the store or for the product; wherein the request from the primary customer to set the one or more limits on the store or the product for the dependent customer account is received through the use of the data capture device in the mobile device;
  an executable portion configured for saving the one or more limits on the store or the product received from the primary customer in a memory device;
  an executable portion configured for receiving a request from the dependent customer to view the one or more limits on the store or the product;
  an executable portion configured for allowing the dependent customer to view the one or more limits on the store or the product in a limit interface;
  an executable portion configured for receiving a request from a merchant to allow the dependent customer to make a transaction using the dependent payment device;
  an executable portion configured for comparing the proposed transaction against the one or more limits stored in the memory device;
  an executable portion configured for approving or denying the transaction the dependent customer is trying to make based on the comparison of the transaction against the one or more limits stored in the memory device.

40. The computer program product of claim 39, further comprising:
  an executable portion configured for receiving an application for the dependent payment device from the primary customer listing a person as the dependent customer.

41. The computer program product of claim 39, wherein the one or more limits comprise a transaction prevention limit that controls the transactions made by the dependent customer by preventing the dependent customer from making transactions at the store or for the product.

42. The computer program product of claim 39, wherein the one or more limits comprise a transaction allowance limit that controls the transactions made by the dependent customer by allowing the dependent customer to make transactions at the store or for the product.

43. The computer program product of claim 39, wherein the one or more limits comprise a monetary limit on an amount the dependent customer can spend at the store or for the product.

44. The computer program product of claim 39, wherein the one or more limits comprise a time limit on the transaction the dependent customer can make at the store or for the product.

45. The computer program product of claim 39, further comprising:
  an executable portion configured for receiving a request from a merchant to allow the primary customer to make a second transaction using the dependent payment device; and
  an executable portion configured for allowing the primary customer to make the second transaction regardless if the second transaction meets or does not meet the one or more limits set on the store or the product.

46. The computer program product of claim 39, further comprising:
  an executable portion configured for receiving a request from the dependent customer to view transaction history; and an executable portion configured for allowing the dependent customer to view the transaction history in a transaction history interface.

47. The computer program product of claim 39, further comprising:
an executable portion configured for receiving a request from the primary customer to view transaction history; and
an executable portion configured for allowing the primary customer to view the transaction history in a transaction history interface.

48. The computer program product of claim 39, further comprising:
an executable portion configured for receiving a request from the primary customer to view the one or more limits on the store or the product; and
an executable portion configured for allowing the primary customer to view the one or more limits on the store or the product in a limit interface.

49. The computer program product of claim 39, wherein the one or more limits comprise one or more limits on the store, and wherein the one or more limits on the store are assigned using a Merchant Category Code, a store type, or a store name.

50. The computer program product of claim 39, wherein the one or more limits comprise one or more limits on the product, and wherein the one or more limits on the product are assigned using a Universal Product Code, or Stock Keeping Unit.

51. The computer program product of claim 39, wherein the dependent payment device comprises a credit card.

52. The computer program product of claim 39, wherein the dependent payment device comprises a debit card.

53. The computer program product of claim 39, wherein the dependent payment device is associated with a credit account for which the primary customer is at least partially responsible.

54. The computer program product of claim 39, wherein the executable portion configured for receiving a request from a primary customer to set one or more limits on a store or a product comprises receiving the request from a data capture device located in a mobile device.

55. The computer program product of claim 39, further comprising:
an executable portion configured for notifying the dependent customer of the one or more limits when the primary customer sets or changes the one or more limits, through the use of the processor.

56. The computer program product of claim 39, further comprising:
an executable portion configured for notifying the primary customer when the transaction the dependent customer is trying to make is denied.

57. The computer program product of claim 39, further comprising: an executable portion configured for receiving information, from a data capture device from the dependent customer, regarding a store the dependent customer is located at or a product that the dependent customer is interested in; an executable portion configured for determining whether the store the dependent customer is located at or the product that the dependent customer is interested in is has an associated limit; and an executable portion configured for notifying the dependent customer when the store the customer is located at or the product that the dependent customer is interested in has an associated limit.

* * * * *